(12) United States Patent
Asai (10) Patent No.: US 7,783,751 B2
(45) Date of Patent: Aug. 24, 2010

(54) COMMUNICATION SYSTEM, PROXY SERVER, METHOD OF CONTROLLING SAME AND CONTROL PROGRAM THEREFOR

(75) Inventor: Arito Asai, Asaka (JP)

(73) Assignee: Fujifilm Corporation, Tokyo (JP)

( * ) Notice: Subject to any disclaimer, the term of this patent is extended or adjusted under 35 U.S.C. 154(b) by 162 days.

(21) Appl. No.: 12/139,200

(22) Filed: Jun. 13, 2008

(65) Prior Publication Data
US 2009/0006612 A1 Jan. 1, 2009

(30) Foreign Application Priority Data
Jun. 27, 2007 (JP) .............................. 2007-169318

(51) Int. Cl.
G06F 15/16 (2006.01)
G06F 12/00 (2006.01)
(52) U.S. Cl. ...................... 709/224; 709/217
(58) Field of Classification Search ......... 709/223–229, 709/217–218, 230
See application file for complete search history.

(56) References Cited

U.S. PATENT DOCUMENTS

| | | | | |
|---|---|---|---|---|
| 6,480,901 B1* | 11/2002 | Weber et al. | ................ | 709/246 |
| 7,287,094 B2* | 10/2007 | Mogul | ......................... | 709/246 |
| 2002/0052889 A1* | 5/2002 | Shinoda | ...................... | 707/500 |
| 2003/0018753 A1* | 1/2003 | Seki | ........................... | 709/219 |
| 2004/0221063 A1* | 11/2004 | Mogul | ......................... | 709/246 |
| 2005/0021772 A1* | 1/2005 | Shedrinsky | ................ | 709/228 |
| 2006/0235941 A1* | 10/2006 | Arcas et al. | ................. | 709/217 |

FOREIGN PATENT DOCUMENTS

JP 2003-141002 A 5/2003

* cited by examiner

Primary Examiner—Zarni Maung
(74) Attorney, Agent, or Firm—Birch, Stewart, Kolasch & Birch, LLP (57) ABSTRACT

It is arranged so that the history of access to a web page at a terminal device that does not have a unique IP address can be determined. To achieve this, a proxy server generates identification data of the terminal device upon accepting a request for a web page from the terminal device the first time. A link destination URL included in the web page conforming to the request is changed by the proxy server and a web page in which the URL after the change has been embedded is displayed on the terminal device. If the proxy server is requested for the web page having the URL after the change, the URL is restored by the proxy server to the URL that prevailed before the change and the web server is requested for the web page having the URL that prevailed before the change. Since the URL after the change is one that only the terminal device of the generated identification data can ascertain, the history of access by the terminal device can be determined by storing the URL, which prevailed before the change, of the requested web page in correspondence with the identification data.

4 Claims, 7 Drawing Sheets

CONVERSION /REVERSE CONVERSION TABLE

| LINK DESTINATION URL AFTER CONVERSION | LINK DESTINATION URL BEFORE CONVERSION | LINK SOURCE URL | CLIENT IDENTIFICATION DATA | ACCESS TIME |
|---|---|---|---|---|
| xa.html | pagea.html | index.html | USER A | 2007:02:26:20:35:35 |
| x1.html | page1.html | pagea.html | USER A | 2007:02:26:20:36:10 |
| ...... | ...... | ...... | ...... | ...... |

COMMUNICATION SYSTEM, PROXY SERVER, METHOD OF CONTROLLING SAME AND CONTROL PROGRAM THEREFOR

BACKGROUND OF THE INVENTION

1. Field of the Invention

This invention relates to a communication system, a proxy server, a method of controlling the proxy server and a program for controlling the proxy server.

2. Description of the Related Art

There are instances where the access log of a web server is analyzed in order to raise the number of accesses to a web page. When a web server is accessed using a personal computer, an IP (Internet Protocol) address specific to the personal computer is recorded in the access log of the accessed web server. Since the IP address of the personal computer is computer-specific, the history of access to a web page can be determined on a per-computer basis.

Thus, when a web server is accessed using a personal computer, the history of access to a web page can be ascertained. In order for a mobile telephone to access a web server via a gateway, however, the IP address of the gateway is transmitted to the web server. Consequently, even if a different mobile telephone transmits an IP address to a web server via the same gateway, the IP address is that of the same gateway. This means that a history of access to a web server often cannot be determined on per-mobile-telephone basis.

Further, in the case of a mobile telephone, the length of the URLs that can be handled is limited. For this reason, a technique that enables a web page to be accessed irrespective of such a limitation has been proposed (see the specification of Japanese Patent Application Laid-Open No. 2003-141002). Even with this technique, however, a history of access to a web page cannot be ascertained on a per-mobile-telephone basis.

SUMMARY OF THE INVENTION

Accordingly, an object of the present invention is to so arrange it that a history of access to a web page can be determined for every client terminal device typified by a mobile telephone.

The present invention pertains to a communication system comprising a client terminal device, a proxy server and a web server.

The proxy server includes: a first request data receiving device for receiving request data, which is transmitted from the client terminal device, requesting a web page specified by a URL; a determination device for determining whether the URL of the web page requested by the request data received by the first request data receiving device is one that has not been converted in the proxy server; an identification data generating device for generating identification data of the client terminal device in response to a determination by the determination device that the URL of the requested web page has not been converted in the proxy server; a first transmitting device for transmitting the request data received by the first request data receiving device to the web server in response to a determination by the determination device that the URL of the requested web page has not been converted in the proxy server; a URL reverse-converting device for restoring a converted URL to the URL that prevailed before the conversion, in response to a determination by the determination device that the URL of the requested web page has been converted in the proxy server; and a second request data transmitting device for transmitting request data, which requests a web page specified by the URL that has been restored by the URL reverse-converting device, to the web server.

The web server includes: a second request data receiving device for receiving request data that has been transmitted from the first request data transmitting device or second request data transmitting device of the proxy server; and a first web page data transmitting device for transmitting data of a web page, which has been requested by the request data received by the second request data receiving device, to the proxy server.

The proxy server further includes: a link destination URL converting device for converting a link destination URL that indicates a link destination of a web page, the link destination URL being included in the web page represented by the web page data that has been transmitted from the first web page data transmitting device of the web server; a second web page data transmitting device for transmitting web page data, which represents the web page containing the link destination URL that has been converted by the link destination converting device, to the client terminal device; and a storage control device for controlling a storage device in such a manner that the identification data generated by the identification data generating device and the URL before conversion by the link destination converting device are stored in correspondence with each other.

The client terminal device includes: a web page data receiving device for receiving web page data transmitted from the second web page data transmitting device of the proxy server; a designating device for designating one link destination URL among link destination URLs included in the web page represented by the web page data received by the web page data receiving device; and a second request data transmitting device for transmitting the request data, which requests a web page specified by the link destination URL designated by the designating device, to the proxy server.

In accordance with the present invention, a client terminal device transmits request data, which requests a web page specified by a URL (Uniform Resource Locator), to a proxy server. When the request data transmitted from the client terminal device is received by the proxy server, the latter determines whether the URL of the web page requested by the received request data is one that has been converted in the proxy server.

In a case where request data has been transmitted from the client terminal device to the proxy server initially, the URL of the web page requested by this request data is not one that has been converted in the proxy server. Accordingly, the identification data of the client terminal device is generated by the proxy server. Further, the request data that has been received by the proxy server is transmitted to the web server.

When the request data transmitted from the proxy server is received by the web server, the web page data requested by the request data is transmitted from the web server to the proxy server.

When the web page data transmitted from the web server is received by the proxy server, URLs representing link destinations of web pages are converted. The URLs are included in the web page represented by the received web page data. The web page data representing the web page containing the converted URLs is transmitted from the proxy server to the client terminal device.

When the web page data transmitted from the proxy server is received by the client terminal device, one link destination URL among link destination URLs included in the web page represented by the received web page data is designated.

Request data for requesting the web page data specified by the designated URL is transmitted from the client terminal device to the proxy server.

When the request data transmitted from the client terminal device is received by the proxy server, the latter determines whether the URL of the web page requested by the received request data is one that has been converted in the proxy server. Since the link destination URL designated by the client terminal device is one that has been converted in the proxy server, the converted URL is restored to the URL that prevailed before the conversion. Request data for requesting the web page data specified by the restored URL is transmitted from the proxy server to the web server. The generated identification data of the client terminal device and the URL that prevailed before the conversion are stored in correspondence with each other. The URL before the conversion specifies the web page accessed by the client terminal device, and the identification data is specific to the client terminal device. Therefore, the history of a URL of an accessed web page can be stored for every client terminal device. Even in a case where there is no IP address specific to a client terminal device, as in the case of a mobile telephone, a history of access to a web page can be determined for every client terminal device.

When request data transmitted from the proxy server is received by the web server, web page data that is in accordance with this request data is transmitted from the web server to the proxy server.

The present invention also provides a proxy server that constitutes the above-described communication system. Specifically, the present invention provides a proxy server constituting a communication system having a client terminal device, the proxy server and a web server, the proxy server comprising: a determination device for determining whether a URL of a web page requested from the client terminal device is not one that has been converted in the proxy server; an identification data generating device for generating identification data of the client terminal device in response to a determination by the determination device that the URL of the requested web page has not been converted in the proxy server; a first request device for issuing a request from the client terminal device for a web page to the web server in response to a determination by the determination device that the URL of the requested web page has not been converted in the proxy server; a URL reverse-converting device for restoring a converted URL to the URL that prevailed before the conversion, in response to a determination by the determination device that the URL of the requested web page has been converted in the proxy server; a second request device for issuing a request for a web page specified by the URL restored by the URL reverse-converting device to the web server; a link destination URL converting device for converting a link destination URL that indicates a link destination of a web page, the link destination URL being included in the web page represented by the web page data that has been transmitted from the web server in response to the request from the first request device or the second request device; a web page data transmitting device for transmitting web page data, which represents the web page containing the link destination URL that has been converted by the link destination converting device, to the client terminal device; and a storage control device for controlling a storage device in such a manner that the identification data generated by the identification data generating device and the URL before conversion by the link destination converting device are stored in correspondence with each other.

The present invention also provides a method of controlling operation of the above-described proxy server. Specifically, the present invention provides a method of controlling operation of a proxy server constituting a communication system having a client terminal device, the proxy server and a web server, the method comprising: a step of a determination device determining whether a URL of a web page requested from the client terminal device is not one that has been converted in the proxy server; a step of an identification data generating device generating identification data of the client terminal device in response to a determination by the determination device that the URL of the requested web page has not been converted in the proxy server; a step of a first request device issuing a request from the client terminal device for a web page to the web server in response to a determination by the determination device that the URL of the requested web page has not been converted in the proxy server; a step of a URL reverse-converting device restoring a converted URL to the URL that prevailed before the conversion, in response to a determination by the determination device that the URL of the requested web page has been converted in the proxy server; a step of a second request device issuing a request for a web page specified by the URL restored by the URL reverse-converting device to the web server; a step of a link destination URL converting device converting a link destination URL that indicates a link destination of a web page, the link destination URL being included in the web page represented by the web page data that has been transmitted from the web server in response to the request from the first request device or the second request device; a step of a web page data transmitting device transmitting web page data, which represents the web page containing the link destination URL that has been converted by the link destination converting device, to the client terminal device; and a step of a storage control device controlling a storage device in such a manner that the identification data generated by the identification data generating device and the URL before conversion by the link destination converting device are stored in correspondence with each other.

Furthermore, the present invention also provides a program for controlling the above-described proxy server. It may be so arranged that a recording medium storing this program is provided.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

A preferred embodiment of the present invention will be described in detail with reference to the drawings.

Figure 1:
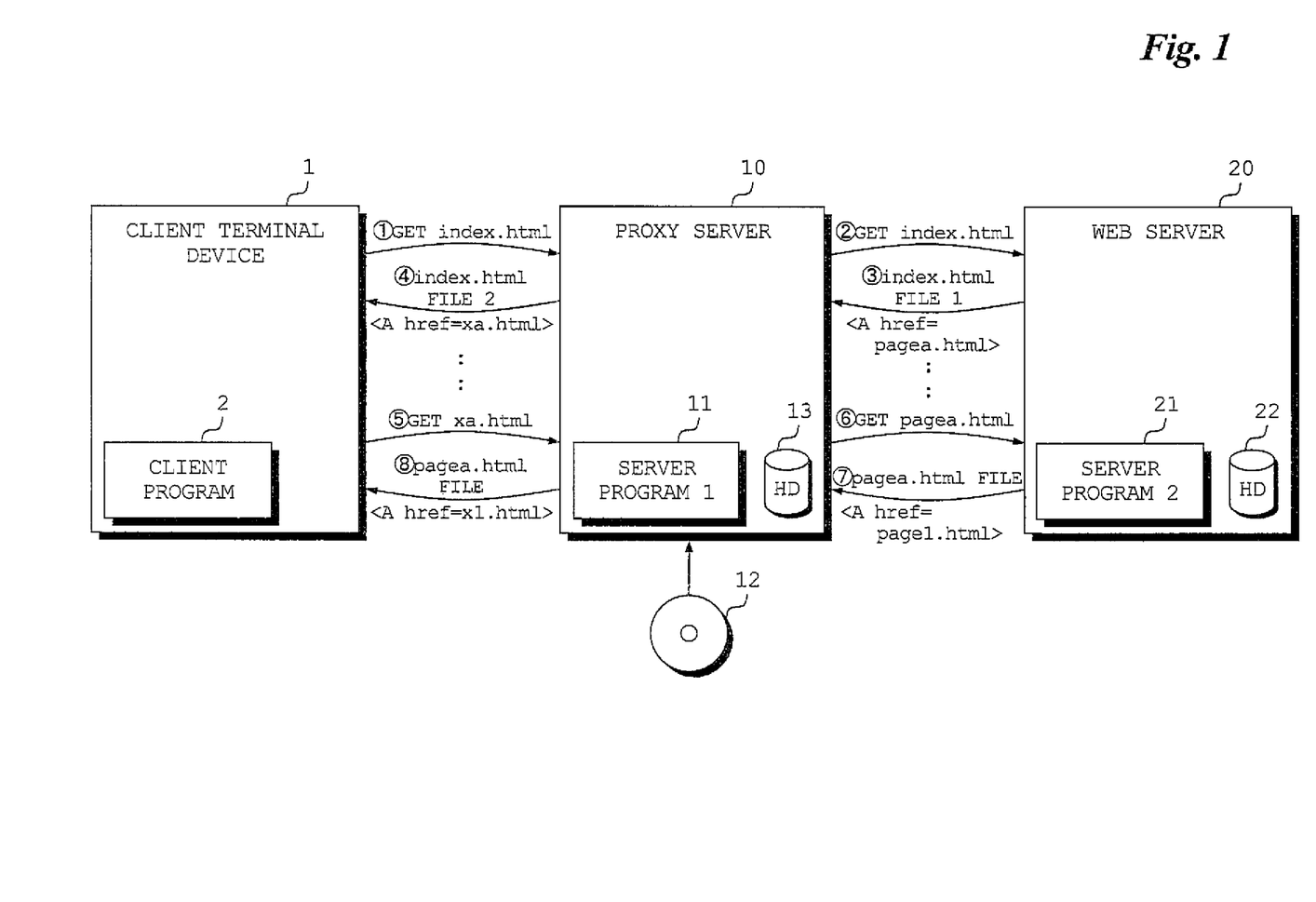
FIG. 1 illustrates the overall configuration of a communication system.

FIG. 1 is a block diagram illustrating the overall configuration of a communication system according to an embodiment of the present invention.

The communication system according to this embodiment includes a client terminal device 1 typified by a mobile telephone (although it goes without saying that the device is not limited to a mobile telephone), a proxy server 10 and a web server 20.

A client program 2 for controlling operation, described later, has been installed in the client terminal device 1. The client terminal device 1 includes a CPU, a display unit for displaying a web page, a communication unit for communicating with the proxy server 10, a keypad for applying various commands and a memory, etc., although none of these are illustrated.

A first server program 11 for controlling operation, described later, has been installed in the proxy server 10. The first server program 11, which has been stored on a CD-ROM (compact-disk—read-only memory), is read by a CD-ROM drive (not shown) and installed in the proxy server 10. Naturally, it may be so arranged that the server program 11 transmitted from another server or the like is received and installed in the proxy server 10. The proxy server 10 further includes a hard disk 13 for storing a conversion/reverse-conversion table, described later, and other data.

A second server program 21 for controlling operation, described later, has been installed in the web server 20. The web server 20 further includes a hard disk 22. Data such as data of a web page displayed on the display unit of the client terminal device 1 has been stored on the hard disk 22.

Both the proxy server 10 and the web server 20 also include a CPU, a display unit, a communication unit, a memory, a hard-disk drive and a keyboard, etc.

When a web page represented by desired web page data that has been stored in the web server 20 is displayed on the display unit of the client terminal device 1, the client terminal device 1 and the proxy server 10 are connected and the proxy server 10 and the web server 20 are connected.

Figure 2:
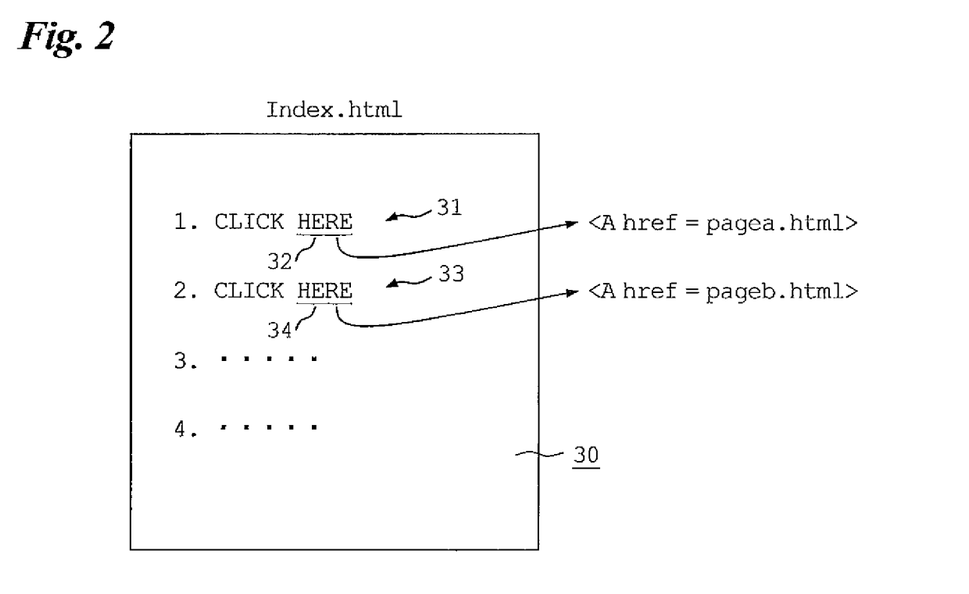
FIGS. 2 and 3 illustrate examples of web pages in which link destination URLs have been embedded.

FIG. 2 illustrates an example of a web page 30 having a URL "index.html".

A web page 30 having the URL "index.html" contains a first character string 31 reading "CLICK HERE" and a second character string 33 reading "CLICK HERE". The character string "HERE" in the first character string 31 is clickable and constitutes hot text 32. The hot text 32 is linked to a web page having a URL "pagea.html". The character string "HERE" in the second character string 33 is clickable and constitutes hot text 34. The hot text 34 is linked to a web page having a URL "pageb.html".

Figure 3:
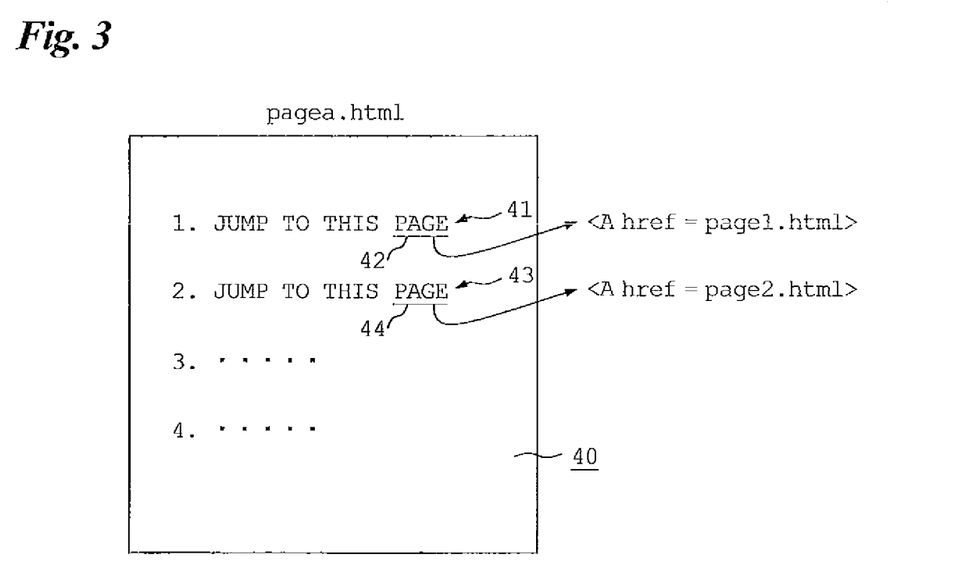

FIG. 3 illustrates an example of the web page having the URL "pagea.html".

Web page 40 having the URL "pagea.html" contains a first character string 41 reading "JUMP TO THIS PAGE" and a second character string 43 reading "JUMP TO THIS PAGE". The character string "PAGE" in the first character string 41 is hot text 42. The hot text 42 is linked to a web page having a URL "page1.html". The character string "PAGE" in the second character string 43 is hot text 44. The hot text 44 is linked to a web page having a URL "page2.html".

If the hot text 32 is clicked in a case where the web page 30 having the URL "index.html" shown in FIG. 2 is being displayed, the web page 40 having the URL "pagea.html", which is the link destination of the hot text 32, is displayed.

Figure 4:
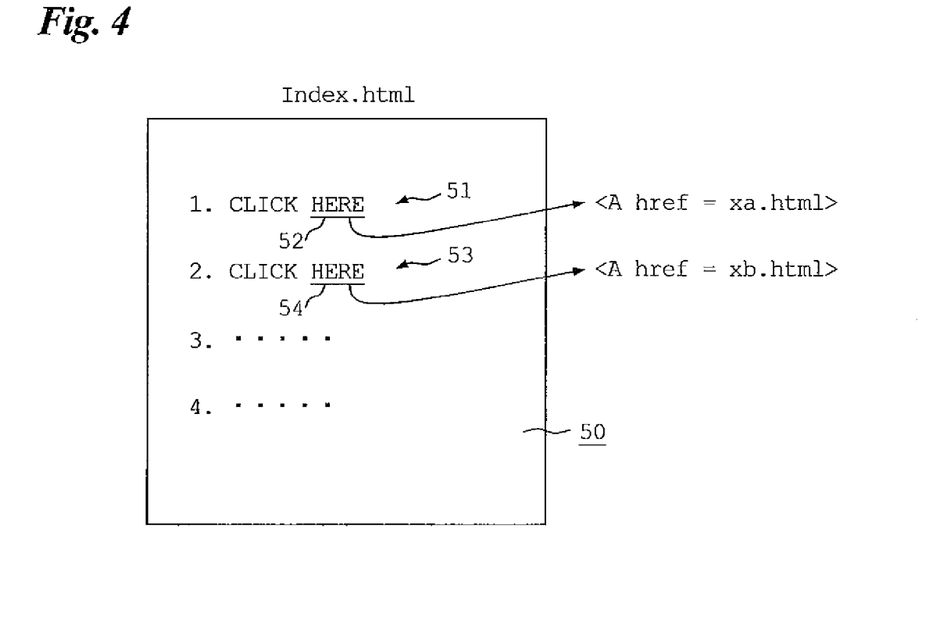
FIGS. 4 and 5 illustrate examples of web pages in which converted link destination URLs have been embedded.

In this embodiment, a web page 50 shown in FIG. 4 is displayed on the client terminal device 1 if the web page 30 shown in FIG. 2 is requested at the client terminal device 1.

FIG. 4 illustrates an example of the web page 50 having the URL "index.html".

In a manner similar to the web page 30 shown in FIG. 2, the web page 50 contains a first character string 51 reading "CLICK HERE" and a second character string 53 reading "CLICK HERE". The character string "HERE" in the first character string 51 is clickable and constitutes hot text 52. The hot text 52 is linked to a web page having a URL "xa.html", which is different from the web page having the URL "pagea.html" that is the link destination of the hot text 32 shown in FIG. 2. The character string "HERE" in the second character string 53 is clickable and constitutes hot text 54. The hot text 54 is linked to a web page having a URL "xb.html", which is different from the web page having the URL "pageb.html" that is the link destination of the hot text 34 shown in FIG. 2.

In this embodiment of the present invention, as shown in FIG. 1, if the client terminal device 1 requests the web page having the URL "index.html" shown in FIG. 2, then the client terminal device 1 sends the proxy server 10 a request "GET index.html". If the URL (index.html) contained in the request has not been converted in the proxy server 10, then the request "GET index.html" is transmitted from the proxy server 10 to the web server 20. In accordance with this request, the web server 20 transmits web page data (index.html file 1), which is for displaying the web page having the URL "index.html" shown in FIG. 2, to the proxy server 10. The URLs which are the link destinations of the hot text are converted in the proxy server 10 in such a manner that the data representing the web page 50 shown in FIG. 4 is obtained from the web page 30 shown in FIG. 2. More specifically, the link destination is converted from "pagea.html" shown in FIG. 2 to "xa.html" shown in FIG. 4, and from "pageb.html" shown in FIG. 2 to "xb.html" shown in FIG. 4. Web page data (index.html file 2), in which the URLs of the link destinations have been converted, is transmitted from the proxy server 10 to the client terminal device 1.

When the web page 50 shown in FIG. 4 is displayed on the display unit of the client terminal device 1, the user of the client terminal device 1 clicks either of the hot text items being displayed on the web page 50. If the hot text 52 is clicked by the user, then the request "GET xa.html" for the web page of "xa.html", which is the link destination of the hot text 52, is sent from the client terminal device 1 to the proxy server 10.

When the request "GET xa.html" for the web page having the URL "xa.html" is received by the proxy server 10, the URL (xa.html) of the requested web page, since it was converted by the proxy server 10, is restored to the original URL (pagea.html) that prevailed before the conversion. The request "GET pagea.html" for the web page having the restored original URL (pagea.html) is transmitted from the proxy server 10 to the web server 20.

When the request "GET pagea.html" for the web page having the URL "pagea.html" transmitted from the proxy server 10 is received by the web server 20, the latter responds to the request by sending the proxy server 10 the web page data (page.html file) representing the web page having the URL "pagea.html", as illustrated in FIG. 3.

Figure 5:
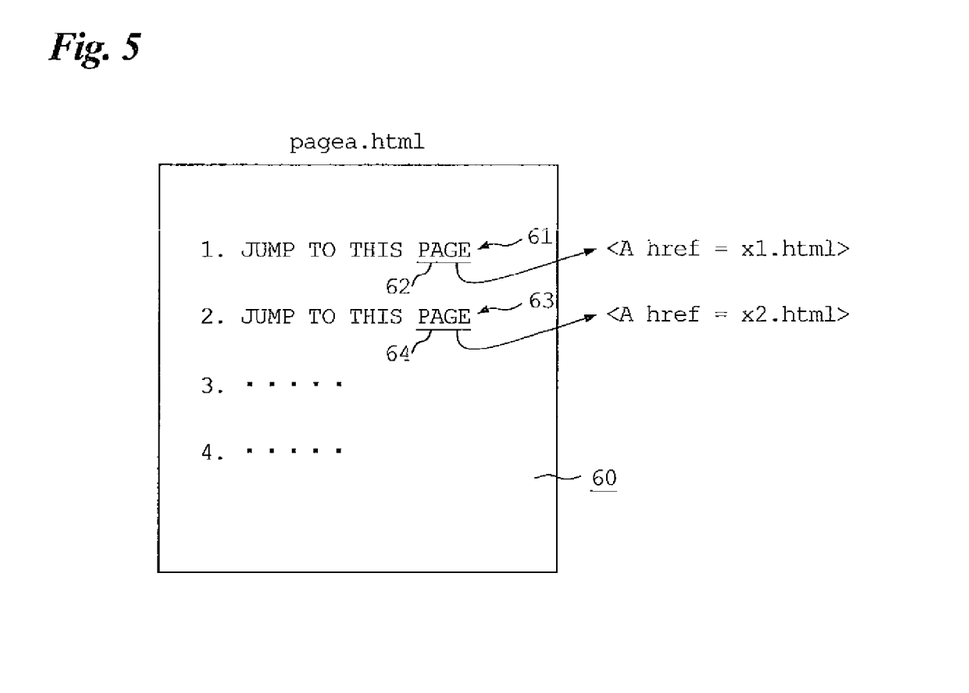

Processing for URL conversion is executed in the proxy server 10 in such a manner that a web page 60 shown in FIG. 5 is displayed from the web page 40 shown in FIG. 3.

In a manner similar to FIG. 3, the web page 60 having the URL "pagea.html" contains a first character string 61 reading "JUMP TO THIS PAGE" and a second character string 63 reading "JUMP TO THIS PAGE". The character string "PAGE" in the first character string 61 is hot text 62. The hot text 62 is linked to a web page having a URL "x1.html" and not to the web page having the URL "page1.html" as in the case of the hot text 52 shown in FIG. 3. The character string "PAGE" in the second character string 63 is hot text 64. The hot text 64 is linked to a web page having a URL "x2.html" and not to the web page having the URL "page2.html" as in the case of the hot text 44 shown in FIG. 3.

Conversion of the link destination URLs contained in the web page is performed by the proxy server 10 in such a manner that the web page 60 shown in FIG. 5 is displayed from the web page 40 shown in FIG. 3. By transmitting the web page data (pagea.html file) in which the link destination URLs have been converted from the proxy server 10 to the client terminal device 1, the web page 60 shown in FIG. 5 is displayed on the display screen of the display unit of client terminal device 1. Thereafter, in a manner similar to that described above, the URL of the web page requested from the client terminal device 1 is reverse-converted by the proxy server 10 and the request for the web page having the URL that prevailed before the conversion is applied to the web server 20, as a result of which the web server 20 transmits the web page data to the client terminal device 1 via the proxy server 10.

Figure 6:
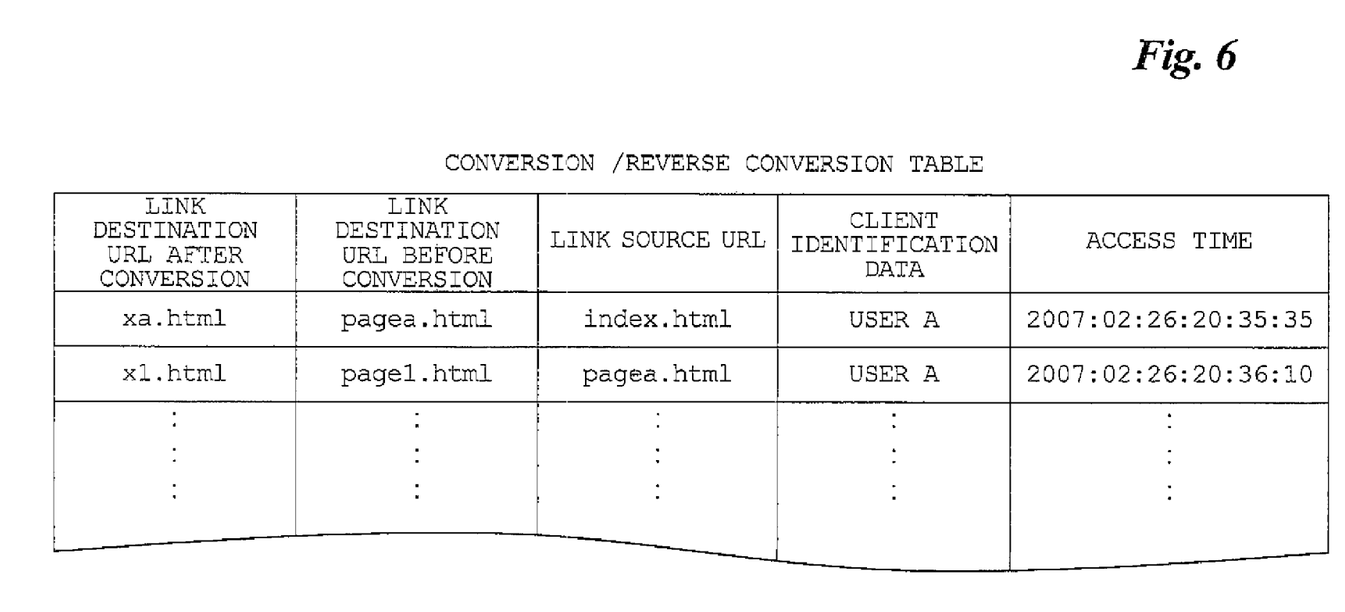
FIG. 6 illustrates an example of conversion/reverse-conversion table.

FIG. 6 illustrates an example of a conversion/reverse-conversion table.

The conversion/reverse-conversion table is stored on the hard disk 13 of the proxy server 10.

Recorded in the conversion/reverse-conversion table are link destination URLs after conversion, link destination URLs before conversion, link source URLs, client identification data and access times. The link source URLs are the URLs of the web pages 30 to 60 to which the link destinations have been affixed by the hot text 32, 34, 42, 44, 52, 54, 62 and 64, as illustrated in FIGS. 2 to 5. The client identification data is generated in order to identify the client terminal device 1 in a case where the URL of a web page requested from the client terminal device 1 has not been converted in the proxy server 10, i.e., in a case where a request is issued from the client terminal device 1 to the proxy server 10 initially. As for access times, if reverse conversion of a URL has been performed, the access time is recorded as an indication of access to the web page having the reverse-converted URL.

Which web page has been accessed by the client terminal device identified by the client identification data can be determined from the history of the link source URLs in the conversion/reverse-conversion table.

Figure 7:
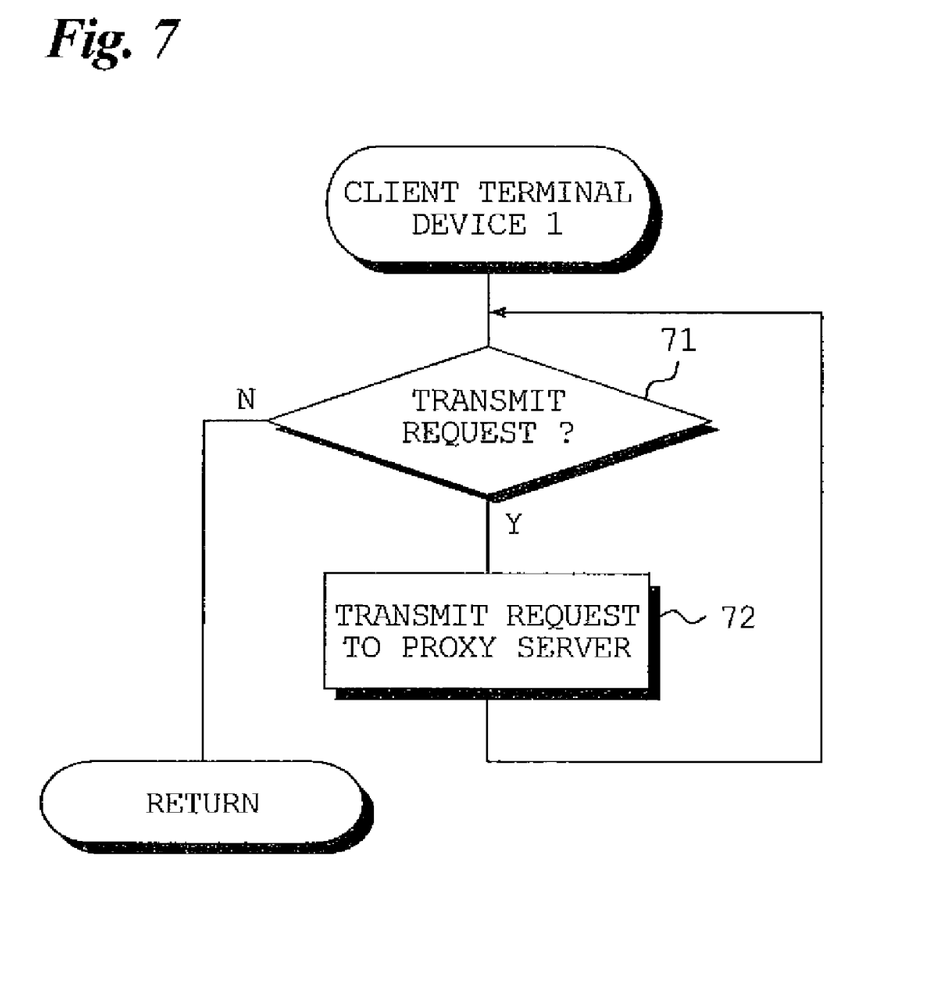
FIG. 7 is a flowchart illustrating processing executed by a client terminal device.
Figure 8:
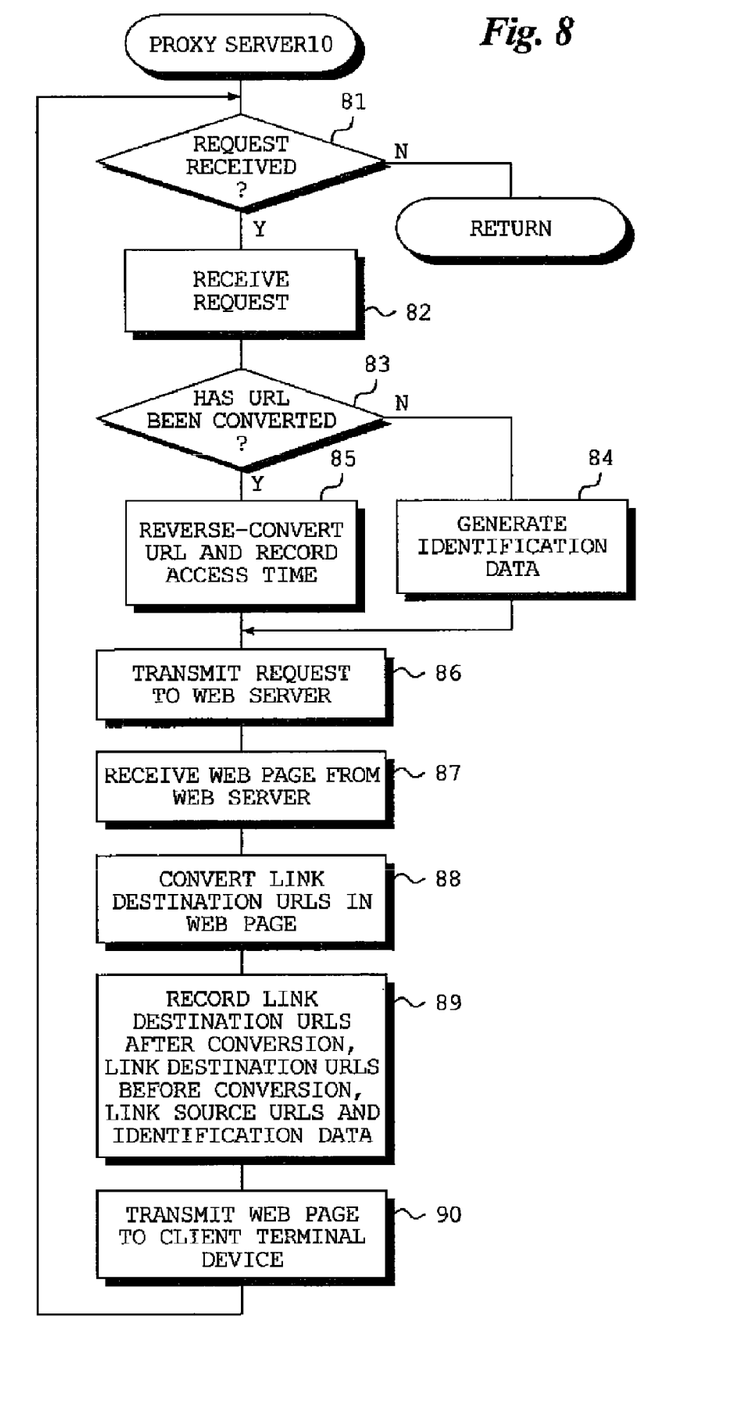
FIG. 8 is a flowchart illustrating processing executed by a proxy server.
Figure 9:
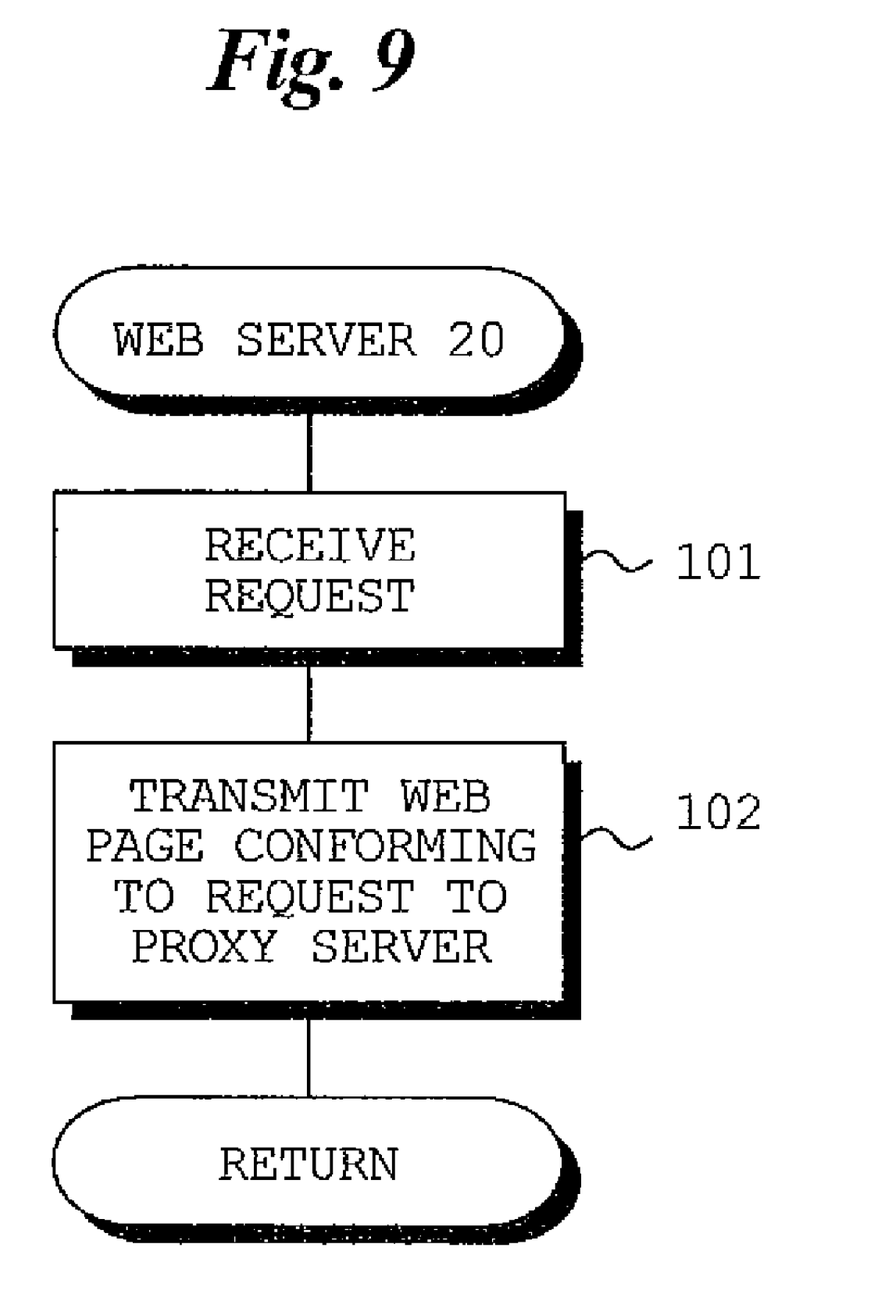
FIG. 9 is a flowchart illustrating processing executed by a web server.

FIGS. 7 to 9 are flowcharts illustrating processing executed among the client terminal device 1, proxy server 10 and web server 20. FIG. 7 illustrates the processing executed by the client terminal device 1, FIG. 8 the processing executed by the proxy server 10 and FIG. 9 the processing executed by the web server 20.

First, the client terminal device 1 sends the proxy server 10 a request for a web page specified by the URL of the web page ("YES" at step 71 in FIG. 7; step 72 in FIG. 7).

When the request transmitted from the client terminal device 1 is received by the proxy server 10 (steps 81 and 82 in FIG. 8), it is determined whether the URL of the web page specified by the received request is one that has been converted in the proxy server 10 (step 83 in FIG. 8).

If the request for the web page has been transmitted to the proxy server 10 for the first time, then the URL of the web page specified by this request is one that has not been converted in the proxy server 10 ("NO" at step 83 in FIG. 8). Therefore, identification data specific to the client terminal device 1 that transmitted the request is generated by the proxy server 10 (step 84 in FIG. 8). The request received is transmitted from the proxy server 10 to the web server 20 (step 86 in FIG. 8).

The request transmitted from the proxy server 10 is received by the web server 20 (step 101 in FIG. 9), whereupon data representing the web page having the URL specified by this request is transmitted from the web server 20 to the proxy server 10 (step 102 in FIG. 9).

When the web page data transmitted from the web server 20 is received by the proxy server 10 (step 87 in FIG. 8), the link destination URLs that have been embedded in the hot text contained in the web page represented by the received web page data are converted (step 88 in FIG. 8). The URLs after the conversion, the URLs before the conversion, the link source URLs (the URLs of the web pages) and the identification data are recorded in the conversion/reverse-conversion table (step 89 in FIG. 8). The web page data in which the link destination URLs have been converted is transmitted from the proxy server 10 to the client terminal device 1 (step 90 in FIG. 8).

When the web page data transmitted from the proxy server 10 is received by the client terminal device 1, hot text contained in the web page represented by the received web page data is clicked. When this is done, a request for the web page having the link destination URL embedded in this hot text is transmitted from the client terminal device 1 to the proxy server 10 ("YES" at step 71 in FIG. 7; step 72 in FIG. 7).

When the request transmitted from the client terminal device 1 is received by the proxy server 10 (steps 81, 82 in FIG. 8), it is determined whether the URL specified by this request is a URL that has been converted (step 83). In this case, the URL is one that has been converted ("YES" at step 83 in FIG. 8) and therefore the URL is restored to the URL before the conversion by referring to the conversion/reverse-conversion table (step 85 in FIG. 8). Further, the access time is recorded in the conversion/reverse-conversion table (step 85 in FIG. 8). The request for the web page specified by the reverse-converted URL is transmitted from the proxy server 10 to the web server 20 (step 86 in FIG. 8), whereby data representing the web page having the reverse-converted URL is transmitted from the web server 20 to the proxy server 10 (step 72 in FIG. 7). Link destination URLs that have been embedded in the web page are converted in the proxy server 10 (step 88 in FIG. 8). The converted link destination URLs, etc., are recorded in the conversion/reverse-conversion table (step 89 in FIG. 8). The web page data in which the link destination URLs have been converted is transmitted from the proxy server 10 to the client terminal device 1 (step 90 in FIG. 8). Processing is subsequently repeated in similar fashion when a request is sent from the client terminal device 1 to the proxy server 10.

As many apparently widely different embodiments of the present invention can be made without departing from the spirit and scope thereof, it is to be understood that the invention is not limited to the specific embodiments thereof except as defined in the appended claims.

What is claimed is:

1. A communication system comprising a client terminal device, a proxy server and a web server, wherein said proxy server includes:

a first request data receiving device for receiving request data, which is transmitted from said client terminal device, requesting a web page specified by a URL;

a determination device for determining whether the URL of the web page requested by the request data received by said first request data receiving device is one that has not been converted in said proxy server;

an identification data generating device for generating identification data of said client terminal device in response to a determination by said determination device that the URL of the requested web page has not been converted in said proxy server;

a first transmitting device for transmitting the request data received by said first request data receiving device to said web server in response to a determination by said determination device that the URL of the requested web page has not been converted in said proxy server;

a URL reverse-converting device for restoring a converted URL to the URL that prevailed before the conversion, in response to a determination by said determination device that the URL of the requested web page has been converted in the proxy server; and a second request data transmitting device for transmitting request data, which requests a web page specified by the URL that has been restored by said URL reverse-converting device, to said web server;

said web server includes:

a second request data receiving device for receiving request data that has been transmitted from said first request data transmitting device or said second request data transmitting device of said proxy server; and a first web page data transmitting device for transmitting data of a web page, which has been requested by the request data received by said second request data receiving device, to said proxy server;

said proxy server further includes:

a link destination URL converting device for converting a link destination URL that indicates a link destination of a web page, the link destination URL being included in the web page represented by the web page data that has been transmitted from said first web page data transmitting device of said web server;

a second web page data transmitting device for transmitting web page data, which represents the web page containing the link destination URL that has been converted by said link destination converting device, to said client terminal device; and a storage control device for controlling a storage device in such a manner that the identification data generated by said identification data generating device and the URL before conversion by said link destination converting device are stored in correspondence with each other; and said client terminal device includes:

a web page data receiving device for receiving web page data transmitted from said second web page data transmitting device of said proxy server;

a designating device for designating one link destination URL among link destination URLs included in the web page represented by the web page data received by said web page data receiving device; and a second request data transmitting device for transmitting request data, which requests a web page specified by the link destination URL designated by said designating device, to said proxy server.

2. A proxy server constituting a communication system having a client terminal device, the proxy server and a web server, said proxy server comprising:

a determination device for determining whether a URL of a web page requested from said client terminal device is not one that has been converted in said proxy server;

an identification data generating device for generating identification data of said client terminal device in response to a determination by said determination device that the URL of the requested web page has not been converted in the proxy server;

a first request device for sending a request from said client terminal device for a web page to said web server in response to a determination by said determination device that the URL of the requested web page has not been converted in said proxy server;

a URL reverse-converting device for restoring a converted URL to the URL that prevailed before the conversion, in response to a determination by said determination device that the URL of the requested web page has been converted in said proxy server;

a second request device for issuing a request for a web page specified by the URL restored by said URL reverse-converting device to said web server;

a link destination URL converting device for converting a link destination URL that indicates a link destination of a web page, the link destination URL being included in the web page represented by the web page data that has been transmitted from said web server in response to the request from said first request device or said second request device;

a web page data transmitting device for transmitting web page data, which represents the web page containing the link destination URL that has been converted by said link destination converting device, to said client terminal device; and a storage control device for controlling a storage device in such a manner that the identification data generated by said identification data generating device and the URL before conversion by said link destination converting device are stored in correspondence with each other.

3. A method of controlling operation of a proxy server constituting a communication system having a client terminal device, the proxy server and a web server, the method comprising:

a step of a determination device determining whether a URL of a web page requested from the client terminal device is not one that has been converted in the proxy server;

a step of an identification data generating device generating identification data of the client terminal device in response to a determination by the determination device that the URL of the requested web page has not been converted in the proxy server;

a step of a first request device sending a request from the client terminal device for a web page to the web server in response to a determination by the determination device that the URL of the requested web page has not been converted in the proxy server;

a step of a URL reverse-converting device restoring a converted URL to the URL that prevailed before the conversion, in response to a determination by the determination device that the URL of the requested web page has been converted in the proxy server;

a step of a second request device issuing a request for a web page specified by the URL restored by the URL reverse-converting device to the web server;

a step of a link destination URL converting device converting a link destination URL that indicates a link destination of a web page, the link destination URL being included in the web page represented by the web page data that has been transmitted from the web server in response to the request from the first request device or the second request device;

a step of a web page data transmitting device transmitting web page data, which represents the web page containing the link destination URL that has been converted by the link destination converting device, to the client terminal device; and a step of a storage control device controlling a storage device in such a manner that the identification data generated by the identification data generating device and the URL before conversion by the link destination converting device are stored in correspondence with each other.

4. A computer readable storage medium storing A program for controlling a proxy server constituting a communication system having a client terminal device, the proxy server and a web server, said program causing the proxy server to execute the following processing:

determining whether a URL of a web page requested from the client terminal device is not one that has been converted in the proxy server;

generating identification data of the client terminal device in response to a determination that the URL of the requested web page has not been converted in the proxy server;

sending a request from the client terminal device for a web page to the web server in response to a determination that the URL of the requested web page has not been converted in the proxy server;

restoring a converted URL to the URL that prevailed before the conversion, in response to a determination that the URL of the requested web page has been converted in the proxy server;

requesting the web server for a web page specified by the restored URL;

converting a link destination URL that indicates a link destination of a web page, the link destination URL being included in the web page represented by the web page data that has been transmitted from the web server in response to the request;

transmitting web page data, which represents the web page containing the link destination URL that has been converted, to the client terminal device; and controlling a storage device in such a manner that the generated identification data and the URL before conversion are stored in correspondence with each other.

\* \* \* \* \*